(12) United States Patent
Doken et al.

(10) Patent No.: US 12,511,699 B2
(45) Date of Patent: Dec. 30, 2025

(54) SYSTEMS AND METHODS FOR CREATING SOCIAL ROOMS BASED ON PREDICTED FUTURE EVENTS

(71) Applicant: Adeia Guides Inc., San Jose, CA (US)

(72) Inventors: Serhad Doken, Bryn Mawr, PA (US); Dhananjay Lal, Englewood, CO (US); Tao Chen, Palo Alto, CA (US); Aldis Sipolins, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 141 days.

(21) Appl. No.: 18/402,105

(22) Filed: Jan. 2, 2024

(65) Prior Publication Data

US 2025/0217899 A1     Jul. 3, 2025

(51) Int. Cl.
*G06Q 50/00*    (2024.01)
*H04L 12/18*    (2006.01)
*H04L 51/52*    (2022.01)

(52) U.S. Cl.
CPC ......... *G06Q 50/01* (2013.01); *H04L 12/1818* (2013.01); *H04L 12/1827* (2013.01); *H04L 51/52* (2022.05)

(58) Field of Classification Search
CPC . G06Q 50/01; H04L 12/1818; H04L 12/1827; H04L 51/52
See application file for complete search history.

(56) References Cited

U.S. PATENT DOCUMENTS 9,906,610 B1 *   2/2018   Foster ................. H04L 67/53
10,291,735 B2 *   5/2019   Coglitore ............ H04L 67/563
11,983,225 B1 *   5/2024   Connery ............ G06F 16/9035
(Continued)

FOREIGN PATENT DOCUMENTS

WO    WO-2013147812 A1 * 10/2013 ......... G07F 17/3225

OTHER PUBLICATIONS

B. Fan, S. Leng and K. Yang, "A dynamic bandwidth allocation algorithm in mobile networks with big data of users and networks," in IEEE Network, vol. 30, No. 1, pp. 6-10, Jan.-Feb. 2016 (Year: 2016).*

(Continued)

*Primary Examiner* — Sarah M Monfeldt
*Assistant Examiner* — Karma A El-Chanti
(74) *Attorney, Agent, or Firm* — HALEY GUILIANO LLP

(57) ABSTRACT

The present application provides for delivering initiation of social rooms for a predicted future event by evaluating a probability of the future event occurring and pre-allocating server resources of the social network platform based on the evaluated probability and subscriptions for the social room. The social networking server may receive a request, from a device of a host user, to create a social room based on a predicted future event. The social networking server may transmit an invitation to user devices on the social network to subscribe to the social room and then receive subscriptions from the user devices to join the social room. Based on an evaluated probability and the number of subscribers, the social networking server may pre-allocate particular server resources for the social room. If the future event occurs, then the social networking server initiates the social room using the pre-allocated particular server resources and automatically joins the subscribers.

16 Claims, 13 Drawing Sheets

(56) References Cited

U.S. PATENT DOCUMENTS

| | | | | |
|---|---|---|---|---|
| 2012/0030282 A1* | 2/2012 | Brody | ............... | G06Q 50/01 |
| | | | | 709/204 |
| 2014/0012792 A1* | 1/2014 | Huang | ............... | G06F 3/01 |
| | | | | 706/46 |
| 2016/0191450 A1* | 6/2016 | Lineberger | ......... | G06Q 30/0241 |
| | | | | 709/206 |
| 2019/0130364 A1* | 5/2019 | Sun | ............... | G06Q 10/1093 |
| 2020/0351561 A1* | 11/2020 | Spencer | ............... | H04N 21/835 |
| 2022/0191594 A1* | 6/2022 | Devoy, III | ........... | G06Q 20/384 |

OTHER PUBLICATIONS

AWS, "Amazon Managed Streaming for Apache Kafka (MSK)", (https://aws.amazon.com/msk/), (2 pages).

AWS, "Amazon Simple Notification Service", (https://aws.amazon.com/sns/), (2 pages).

BlogGeek.Me, "When will Zoom use WebRTC?", (https://bloggeek.me/when-will-zoom-use-webrtc/#:%7E:text=Zoom%20is%20using%20WebRTC%2C%20just,vs%20Jitsi%20in%20bandwidth%20limiting),(Sep. 16, 2019),(8 pgs.).

Jozsef Vass, "How Discord Handles Two and Half Million Concurrent Voice Users Using WEBRTC", (Sep. 10, 2018), (https://discord.com/blog/how-discord-handles-two-and-half-million-concurrent-voice-users-using-webrtc),(7 pages).

LinkdIn for Creators, "Introducing LinkedIn Audio Events", (https://members.linkedin.com/creator-tools/audioevents), (2 pages).

Mava,"Everything you need to know about Discord Channel, Category and Thread limits", (2 pages).

Rapid API, "Sports Odds and Sports Betting APIs", (https://rapidapi.com/collection/sports-odds-betting-apis), (3 pages).

Sameed Khan, "How to Use Discord Video Chat", (Feb. 26, 2022), (https://jumpshare.com/blog/how-to-use-discord-video-chat/#:%7E:text=Up%20to%2025%20members%20may,and%20mobile%20variants%20of%20Discord.),(7 pgs).

Sukhad Anand, "How does Discord scale to 5 million concurrent users ??", (Dec. 11, 2021), (https://sukhadanand.medium.com/how-does-discord-scale-to-5-million-concurrent-users-ed0874063fd), (4 pages).

X Developer Platform "Spaces overview" (https://developer.twitter.com/en/docs/twitter-api/spaces/overview), (2 pages).

Zoom Support, "Understanding meeting participant limit", (https://support.zoom.com/hc/en/article?id=zm_kb&sysparm_article=KB0068002#:~:text=Once%20a%20meeting%20reach%20capacity,possible%20if%20some%20participants%20leave.), (2 pages).

* cited by examiner

SYSTEMS AND METHODS FOR CREATING SOCIAL ROOMS BASED ON PREDICTED FUTURE EVENTS

BACKGROUND

This disclosure is related to systems and methods for communication channels in social networking mediums.

SUMMARY

Social rooms functioning as communication channels have been gaining even more popularity since they provide an opportunity to interact with people in real time. Common examples of these social room offerings include Discord™, Twitter™ Spaces, LinkedIn™ Live/Audio, Substack™, and various forum chat rooms. These social rooms provide another avenue for content creators to produce content and find interested parties for their content. Social rooms may be adapted to various formats including, but not limited to, any combination of audio, video and/or text. Some users may wish to join a social room because of their interest in a private gathering and enjoying conversation with others as engaged participants. The term "social room" may refer to any type of digital communication platform (hardware and/or software) that enables a short-term digital communication session (e.g., audio, video, XR) between a set of devices.

In some embodiments, a social system simply allows users to initiate social rooms at any time. When such a room is initiated, a device of the initiating user is joined to the social room and a certain amount of server resources are allocated for that social room. The room can then be posted for other users' devices to join. As the devices of other users join the room, the social room allows for instant communication between the joined devices. As more devices join, the server allocates more resources (e.g., more CPU/GPU cores, more memory, additional content delivery network nodes) to maintain the social room. Moreover, under this approach, if devices leave the social room, the allocated resources do not adjust resulting in an inefficient allocation. Such an approach has problems when too many users unexpectedly join, because that may cause the system to be unable to allocate sufficient resources, resulting in poor quality of connection and/or undesired dropping of user devices from the social room.

These issues may be particularly felt when the allowance for creation of social rooms is linked to a possible future event (e.g., to allow a discussion of that event once it has occurred). It is difficult to allocate the requisite resources (e.g., hardware, software, networking, and/or digital storage resources) for a social room when it is unknown how many participants will join, given the fluctuation in probability of the predicted future event occurring. It is particularly challenging to efficiently allocate server resources to meet the demand of the prospective social room just in time for occurrence of an event.

In some approaches, a central server may determine that a social room is needed in the future upon a predicted future event occurring and pre-allocate server resources based on historical information for various data points (e.g., how many resources the server allocated previously, or how many resources the server allocated previously for an analogous event). The problem with these approaches is that they do not effectively pre-allocate server resources based on real-time data in relation to the predicted future event occurring to ensure that the server can effectively cater to the demand from the subscribers if the current circumstances and demand differ from historical precedent.

To overcome these problems, systems and methods are provided herein for delivering initiation of social rooms for a predicted future event by 1) leveraging users who create such rooms ahead of time to allow other users to subscribe to such rooms while also 2) evaluating a probability of the future event occurring. Thus, the pre-allocating of server resources of the social networking platform is based on the subscriptions for the social room and the evaluated probability. In some approaches, a social networking application is installed on a social networking server to implement the steps for initiation of the social rooms. In some approaches, a social networking application may be a part of any other suitable networked service (e.g., a gaming platform, XR platform, sports consumption platform, financial platform, video streaming platform, etc.).

In some embodiments, the social networking server may receive a request, from a device of a host user, to create a social room based on a predicted future event (e.g., Steph Curry the basketball player hitting a game-winning three-point shot during a Warriors/Lakers game). The social networking server may transmit an invitation to user devices to subscribe to the social room (e.g., invitation may be sent to a subset of users or may be a public post on the social networking platform) and then receive subscriptions from user devices on the social networking platform to join the social room.

The social networking server may evaluate a probability of the predicted future event occurring (e.g., the social networking server may determine Stephen Curry's real-time statistics in the current match to determine fatigue, likelihood of scoring, etc.). This evaluation may include the implementation of machine learning models trained with real-time statistics from the present basketball game. Based on this evaluated probability and the number of subscribers, the social networking server may pre-allocate particular server resources such as processing cores, memory storage, and server node selection for the social room.

If the future event occurs (e.g., Stephen Curry hits a game-winning three-point shot), then the social networking server initiates the social room using the pre-allocated particular server resources and automatically joins the subscribers. This enables communication between the device of the host user and the subscribing user devices to interact within the social room and allows for the social networking server to effectively pre-allocate particular server resources for the social room despite the probability fluctuating, and consequently the number of subscribers also fluctuating. In this way, there is not a waste of excess computing resources; and conversely, there is not a ruined social experience due to lack of computing resources allocated for a social room that was bigger than expected. All the subscribers are able to immediately engage in communication in the automatically generated social room upon the predicted future event occurring, as the pre-allocated server resources are sufficient to facilitate the social room.

In some optional embodiments, a social networking server may utilize a gamified scheme in conjunction with the techniques described above. In an example embodiment, the social networking server allocates and charges resource credits for joining/creating social rooms, to better allocate limited computing resources. In one approach, if the predicted future event occurs, a number of resource credits are adjusted for a profile of the host user by the social networking server. Resource credits may be used as points or tokens to interact within the social networking platform. The adjustment of the number of resource credits may be inversely correlated with the probability of the predicted future event occurring. Thus, if the probability was low when the social room was created by the host, but by the time the predicted future event occurs the probability was much higher, then the number of resource credits should be higher (inversely proportional to the low initial probability). In some embodiments, the social networking server determines an updated probability of the predicted future event occurring after the initial calculation. If the updated probability is greater than the initial probability, the resource credits are adjusted by an additional amount for the host user. In some embodiments, a second social room may be desired (e.g., if the predicted future event does not occur). If the second future event does not occur, the social networking server subtracts a number of resource credits from the host user.

In some embodiments, when the social room is initiated and the subset of subscribers is automatically joined, if the host device does not perform an action within a time threshold (e.g., the users are waiting for the host to start the discussion in the social room as the host is the administrator), a number of resource credits is subtracted from the host user by the social networking server. In some embodiments, the social networking server subtracts a number of resource credits from each of the subscribers subscribing to the social room (the subscriber provides an admission fee via resource credits). The gamified scheme where the resource credits are allocated and charged allows for more efficient allocation of resources for predicted social rooms.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
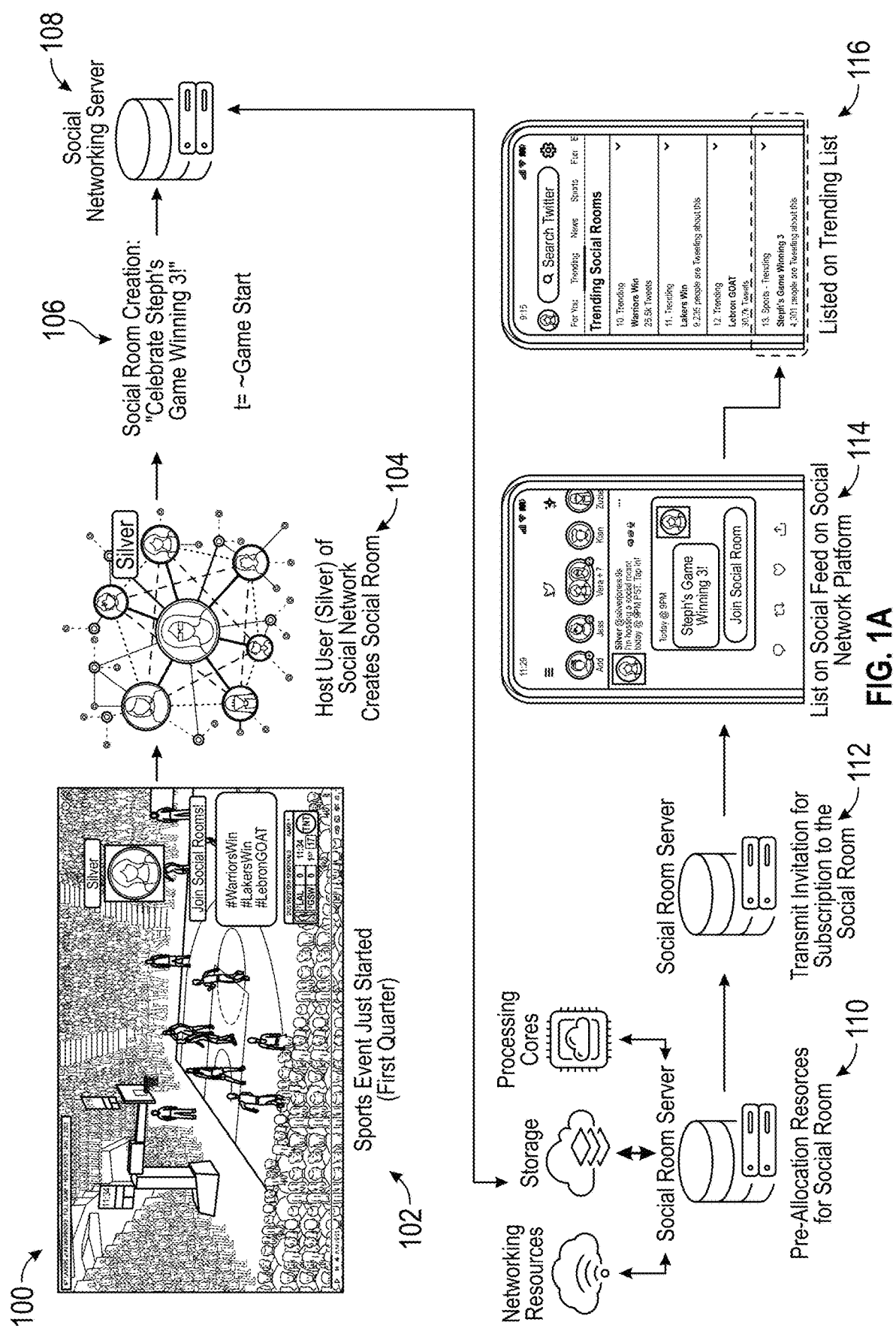
FIG. 1A shows an illustrative scenario in which a social room is initiated on a social networking platform, in accordance with some embodiments of this disclosure.
Figure 1B:
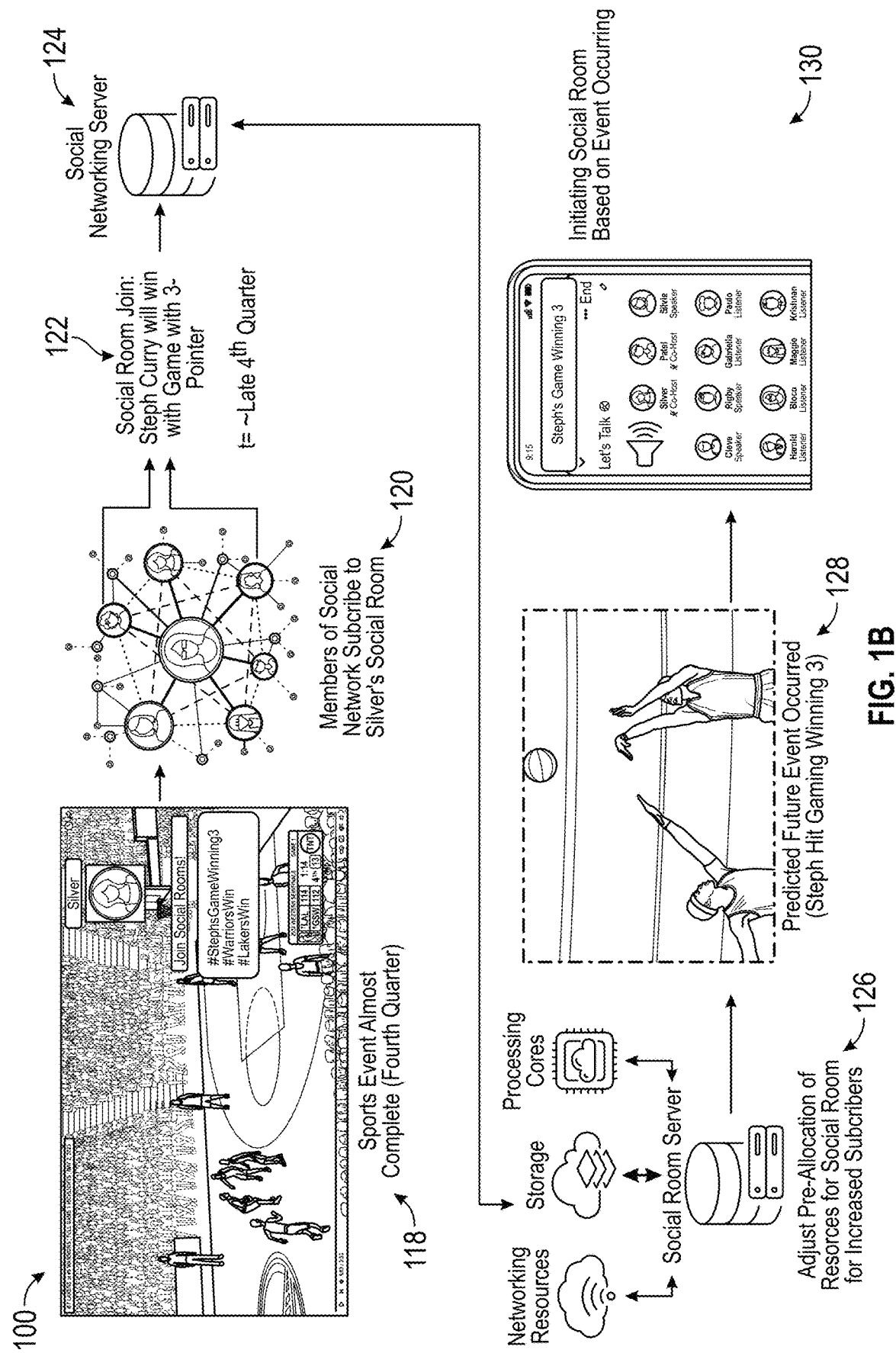
FIG. 1B shows an illustrative scenario in which a social room is initiated on a social networking platform, in accordance with some embodiments of this disclosure.

FIGS. 1A-1B show an illustrative scenario 100 in which a social room is initiated on a social network platform, in accordance with some embodiments of this disclosure. A social networking server 108 may be any user equipment that has control circuitry for processing and communication circuitry to interface with other user devices. The social networking platform may be any electronic interaction between users on user equipment devices that may include textual communication, audio communication, video communication, forums, instant messaging, video game chat interfaces, gaming interfaces, software application interfaces between users, and any other electronic interaction between users allowing for communication. In some embodiments, a software gaming application may have an instant messaging and/or voice/video/VR-chat component between different players, which is also a social networking platform. In some embodiments, an instant messaging and/or voice/video/VR-chat component between different coworkers in a work environment is a social networking platform. In some embodiments, an instant messaging and/or voice/video/VR-chat component between different drivers in vehicles is a social networking platform. In some embodiments, an instant messaging and/or voice/video/VR-chat component between different on-site workers is a social networking platform. In some embodiments, an instant messaging and/or voice/video/VR-chat component between different students in a school, university, college or learning environment is a social networking platform.

In some embodiments, the social networking server receives, from a device of a host user on a social network platform, a request to create a social room based on a predicted future event. For example, a sports event such as a basketball game between the Golden State Warriors and the Los Angeles Lakers has started 102. A host user "Silver" on the social network may be viewing the basketball game. Silver may wish to create a social room based on this basketball game 104. The specific social room is created named "Celebrate Steph's game-winning 3!" 106. This is created very early on during the start of the basketball match. The social networking server receives Silver's request to create the social room based on the predicted future event that Steph Curry (a basketball player for the Golden State Warriors) will score the game-winning point by a three-point shot. In some embodiments, the social networking server may evaluate an initial probability of the predicted future event occurring. In this example, the social networking server determines that the probability at this moment in time (early in the basketball match), the probability is 4% and the projected size of the room is likely 50 people. Moreover, the social networking server may determine the particular server resources 110 at this initial stage as well (e.g., five processing cores, 20 GB storage, 20 TB bandwidth).

The social networking server may transmit an invitation for subscription to the social room to a plurality of user devices on the social network platform. In this example, the social networking server transmits the invitations 112 for subscription via the host user listing it on their social media feed 114. In some embodiments, the invitations may be accessed via a central listing of social rooms. For example, there may be a trending list where the social room is listed as shown in 116. In some embodiments, the social networking server may determine the corresponding user account associated with the user device. This may be useful when a user account is associated with a number of user devices. A verification may be done to ensure that the correct user account is associated with the user device for the invitation to be transmitted.

The social networking server may receive subscriptions for the social room from a subset of the plurality of user devices on the social network platform. In this example, as the basketball match progresses 118, the members of the social networking platform subscribe to Silver's social room 120. At this time, the basketball match is nearing completion in the fourth quarter 122.

The social networking server may evaluate a probability of the predicted future event occurring. In some embodiments, the social networking server evaluates the probability based on real-time data from the event on which the predicted future event is based. For example, the social networking server may retrieve advanced statistics from the current match and further analyze historical data for the two teams to determine a probability. In some embodiments, the social networking server may implement a machine learning model to evaluate the probability. The social networking server may receive training data that is historical data related to past events similar to the predicted future (e.g., historical data of the Golden State Warriors facing the Los Angles Lakers). The social networking server may train a machine learning model based on the received training data. For example, the machine learning model may be a convolutional neural network that is trained with this historical data and potentially current advanced statistics from the current match. The social networking server may then determine the probability of the predicted future event occurring based on inputting current data relating to the predicted future event into the machine learning model. In this example at 124, the social networking server may evaluate the probability to be 51% likely to occur and require a 500-person capacity to meet demand for the social room.

The social networking server may pre-allocate particular server resources of the social network platform based on the probability and the subscriptions for the social room. Particular server resources may include, but are not limited to, processing cores (CPU/GPU), memory storage, or network bandwidth. In this example at 126, the particular server resources to effectively host the social room would require 50 processing cores, 200 GB storage, and 50 TB bandwidth. In some embodiments, the social networking server has a corresponding formula to determine the requisite particular server resources based on the number of participants in the social room that is calculated via the evaluated probability. In this way, the proposed technology can pre-allocate particular server resources to ensure a quality of service that is not calculated at the moment subscribers join the social room. In some embodiments, the social networking server may determine the subscriber's network's latency and pre-allocate particular server resources based on their network latency. For example, the social networking server may group various users based on their network latency and location and assign specific servers that are closer in proximity to those groups of users to mitigate network latency.

The social networking server may, in response to determining that the predicted future event occurred, initiate the social room on the social network platform using the particular server resources of the social network platform. In this example at 128, the predicted future event occurs as Steph Curry hits the game-winning three-pointer. At 130, the social networking server initiates Silver's social room "Steph's Game-Winning 3." The social networking server may automatically join the subset of the plurality of user devices to the social room to enable communication between the device of the host user and the subset of the plurality of user devices. At 130, the subscribers to Silver's social room are automatically joined. The subscribers may have a group voice chat to discuss the event that has occurred. The communication between the device of the host user and the subset of the plurality of user devices may be any type of communication including, but not limited to, textual, audio, video, hologram, meme exchange, picture exchange, token exchange, monetary exchange, and any other electronic interaction between users. In some embodiments, upon automatically joining, the predicted future event that occurred is replayed upon joining for the subscriber with option to replay further if desired. In some embodiments, even before the subscriber is automatically joined, the social networking server may provide a prompt to the subscriber in real time as the predicted future event occurs, and may offer the subscriber an option to instantly replay the predicted future event that occurred even before they are automatically joined into the social room.

In some embodiments, the social networking server may determine, based on the pre-allocated particular server resources, a maximum number of subscribers. The social networking server may then determine, for each subscriber that is received, whether the number of subscribers exceeds the maximum number of subscribers. Upon a determination that the subscribers exceed the maximum number of subscribers, the social networking server may assign the subscriber to a waitlist for the social room. The one or more subscribers on the waitlist are not automatically joined to the social room. The social networking server may determine that one subscriber from the subset that is automatically joined may leave the social room. Upon the leaving of the social room by the one subscriber from the subset, the social networking server may add a subscriber from the waitlist to the social room.

Figure 2A:
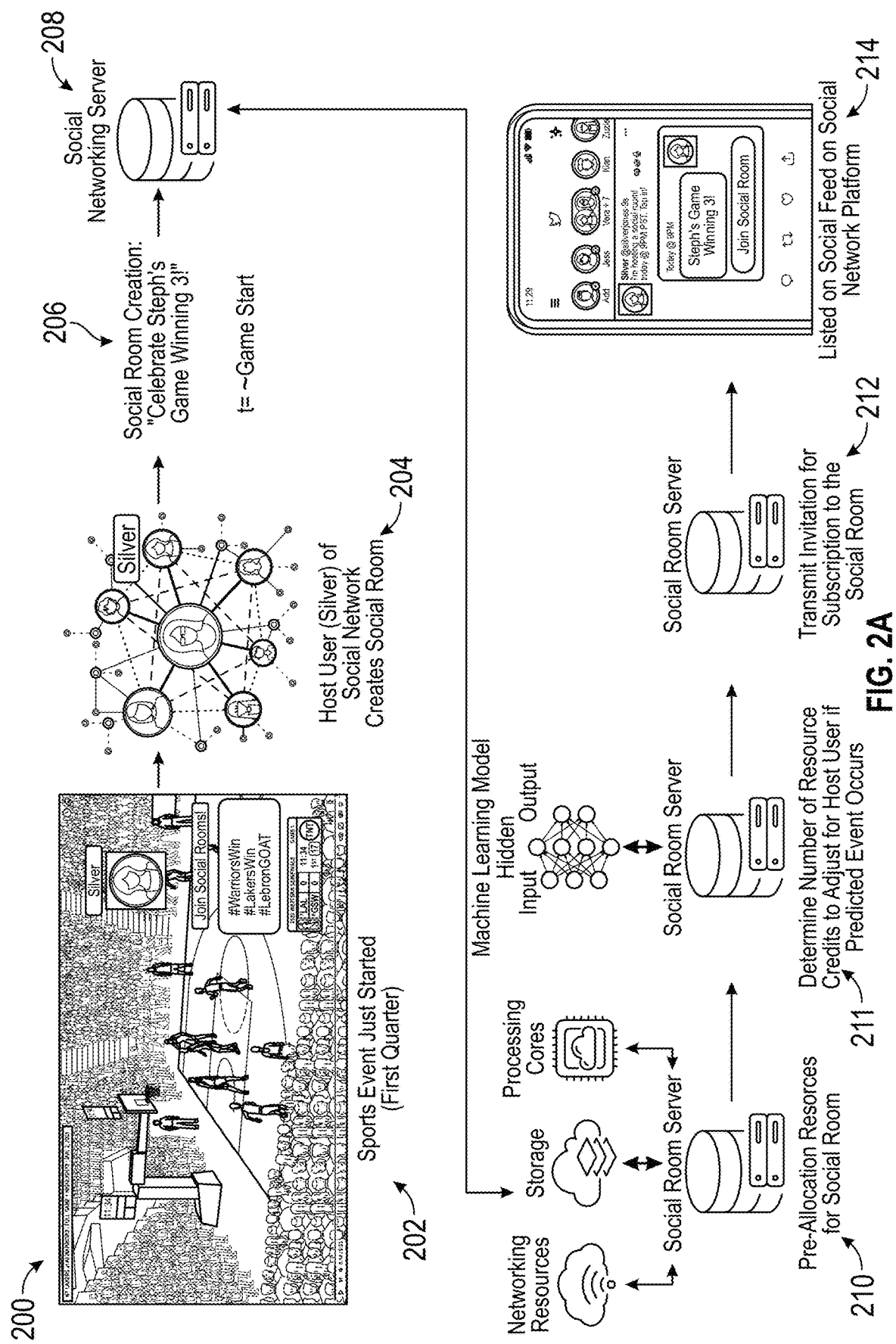
FIG. 2A shows another illustrative scenario, in which a social room is initiated on a social networking platform, in accordance with some embodiments of this disclosure.
Figure 2B:
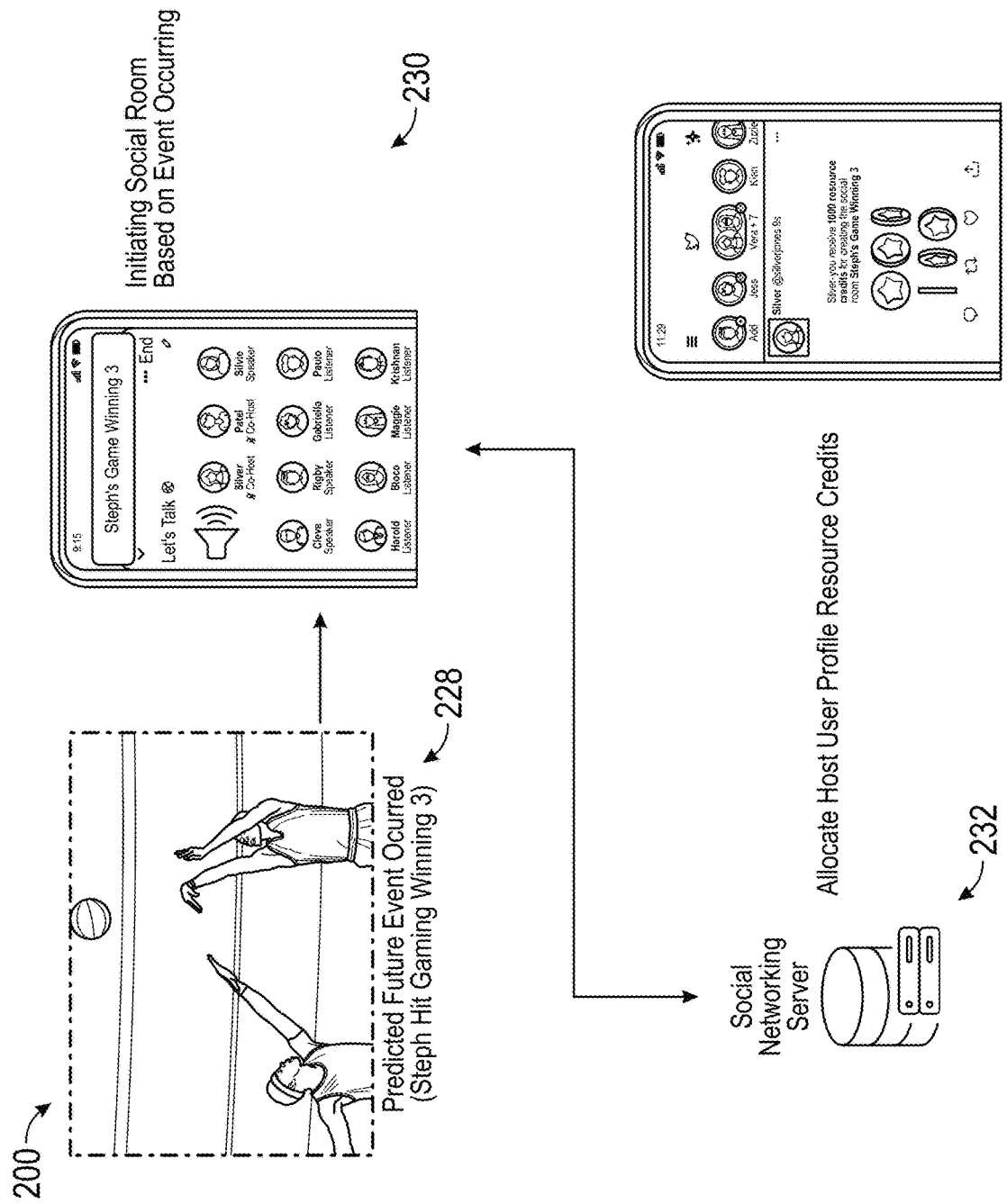
FIG. 2B shows another illustrative scenario in which a social room is initiated on a social networking platform, in accordance with some embodiments of this disclosure.

FIGS. 2A-2B show another illustrative scenario 200 in which a social room is initiated on a social network platform, in accordance with some embodiments of this disclosure. In some embodiments, the social networking server 208 receives, from a device of a host user on a social network platform, a request to create a social room based on a predicted future event. Similar to the example in FIGS. 1A-1B, a sports event such as a basketball match between the Golden State Warriors and the Los Angeles Lakers has started 202. A host user "Silver" creates a social room based on this basketball match 204 named "Celebrate Steph's game-winning 3!" 206. In some embodiments, the social networking server 208 may evaluate an initial probability of the predicted future event occurring. In this example, the social networking server determines that the probability at this moment in time (early in the basketball match), the probability is 4% and the projected size of the room is likely 50 people. Moreover, the social networking server may determine the particular server resources 210 at this initial stage as well (e.g., five processing cores, 20 GB storage, 20 TB bandwidth).

The social networking server may determine 211 the number of resource credits to adjust for the host user if the predicted event occurs. In some embodiments, the social networking server may implement a machine learning model to determine the number of resource credits to adjust for the host user if the predicted event occurs. In some embodiments, the social networking server may implement a constant value of resource credits for adjustment, which may or may not be pre-programmed by an administrator. Resource credits may be used as points or tokens to interact within the social networking platform. For example, resource credits may be allotted to a host user when creating a social room. Resource credits may be deducted from users who subscribe to social rooms. Resource credits may be allotted based on participation within social rooms and/or contests within social rooms. Resource credits may be traded on the social network platform. Resource credits may be exchanged for goods or services on the social network platform.

In some embodiments, the social networking server may provide that the social room has a minimum time threshold to operate. After the minimum time threshold being met, the social networking server may allow the host user to terminate the social room at their discretion via administrative command. In some embodiments, after the minimum time threshold is met, the subset of subscribers may receive resource credits.

At 212, the social networking server transmits the invitation for subscription to the social room to the subscribers via listing the invitation in the social networking platform 214. At 228, in FIG. 2B, the predicted future event occurs as Steph Curry hits the game-winning three-pointer. At 230, the social networking server initiates Silver's social room "Steph's Game-Winning 3." The social networking server may automatically join the subset of the plurality of user devices to the social room to enable communication between the device of the host user and the subset of the plurality of user devices. At 230, the subscribers to Silver's social room are automatically joined. The subscribers may have a group voice chat to discuss the event that has occurred. Moreover, at 232, the social networking server adjusts the number of resource credits for the profile of the host user. The adjustment may be inversely correlated with the probability of the predicted future event occurring. In this scenario, because the initial probability was 4%, the adjustment may be 10× the percentage of evaluated probability given that the initial probability falls in a classification of low probability. In some embodiments, there are various mathematical models that are implemented to administer an inverse correlation for resource credit adjustment.

In some embodiments, the social networking server may pre-allocate particular server resources, namely network bandwidth, by determining a location of the device of the host user and the locations of a plurality of networking resources. For example, the host user may be located in San Francisco, CA while three content delivery servers are located in Las Vegas, NV, New York, NY, and Honolulu, HI. The social networking server may determine at least one networking resource that is the most proximate to the device of the host user and allocate the at least one networking resource to the device of the host user. In this example, the server located in Las Vegas, NV may be the particular service resource that would be allocated to the host user based on closest proximity. In another embodiment, the social networking server may determine a geographic location of networking resources based on the context of the social room. For example, because the subject matter of the social room pertains to Los Angeles and San Francisco geographically, despite a New York user, the networking resource will be proximate to California.

In some embodiments, the social networking server may evaluate the probability of the predicted future event occurring as an initial probability. The social networking server may determine an updated probability of the predicted future event occurring subsequent to the initial probability of the predicted future event occurring. For example, the initial probability was 4%, and the updated probability was 51%. In response to determining that the updated probability is greater than the initial probability, the social networking server adjusts the number of resource credits by an additional amount. This is represented in FIG. 2B at 232, where the updated probability 51% is greater than the initial probability of 4%, and the resource credits are adjusted accordingly. In some embodiments, in response to determining that the updated probability is lower than the initial probability, the social networking server adjusts the number of resource credits by an additional amount (the adjustment may be a subtraction or an addition depending on configuration of the system by the administrator). In some embodiments, in response to the predicted future event not occurring, the social networking server subtracts the number of resource credits from the host user. In some embodiments, the amount of resource credits subtracted from the host user may be at least one of a predetermined constant amount of resource credits, an amount determined by a machine learning model, or an average of an aggregate of resource credits subtracted historically.

In some embodiments, the social networking server may initiate the social room on the social networking platform and designate it as a first social room. The social networking server may then receive, from the device of the host user, another request to create a second social room based on a second predicted future event. For example, the second predicted future event may be that Steph Curry scores 30 points in the basketball match. In response to determining that the second predicted future event does not occur, the social networking server subtracts a number of resource credits from a profile of the host user on the social network platform. In this example, if Steph Curry scores 28 total points in the match, a number of resource credits would be subtracted from the profile of the host user on the social network platform. In another embodiment, upon creation of the first social room, a second social room is automatically initiated with the opposite Boolean outcome. For example, if the first social room is predicated on the predicted future event of Steph Curry hitting a game-winning three-pointer, the second social room is automatically generated for the predicted future event of Steph Curry not hitting a game-winning three-pointer. The second social room may be hosted by any of the subscribers to the social room. In some embodiments, the subscriber who contributes the most resource credits to the social room would become the host of the social room. In some embodiments, the subscriber with the most quantitatively popular social networking profile would become the host of the social room.

In some embodiments, the social networking server may, when automatically joining the subset of the plurality of user devices to the social room to enable the communication between the device of the host user and the subset of the plurality of user devices, determine whether the device of the host user performs an action within the social room within a time threshold. The time threshold may be predetermined, or automatically generated based on average interaction start time. This time threshold ensures that there is an action by the host to initiate participation within the social room. In response to the determining that the profile of the device of the host user does not perform the action within the social room within the time threshold, the social networking server subtracts a number of resource credits from the profile of the host user on the social network platform. In some embodiments, if a subscriber from the subset of subscribers does not accept the auto-joining to the social room, the social networking server may subtract resource credits from the subscriber.

In some embodiments, the social networking server subtracts a number of resource credits from each respective profile associated with each respective user device of the subset of the plurality of user devices subscribing to the social room when receiving a subscription from the respective profile associated with each respective user device. In other embodiments, the social networking server subtracts a number of resource credits from each respective profile associated with each respective user device of the subset of the plurality of user devices subscribing to the social room when auto-joining each respective user device. In some embodiments, a user profile on the social networking platform may follow (i.e., be allowed to view the posted messages in) the social room created by the host user but cannot actively participate in the social room. In this scenario, the following of the social room may require fewer or zero resource credits to follow.

In some embodiments, the social networking server may decline to add a subscriber to the subset of subscribers if the subscriber does not meet a threshold of popularity. In some embodiments, this determination may be discretionary by the host user as to whether to add or decline the subscriber to the social room. In some embodiments, the social networking server may allow the host user to specify the number of resource credits to join the social room.

Figure 3:
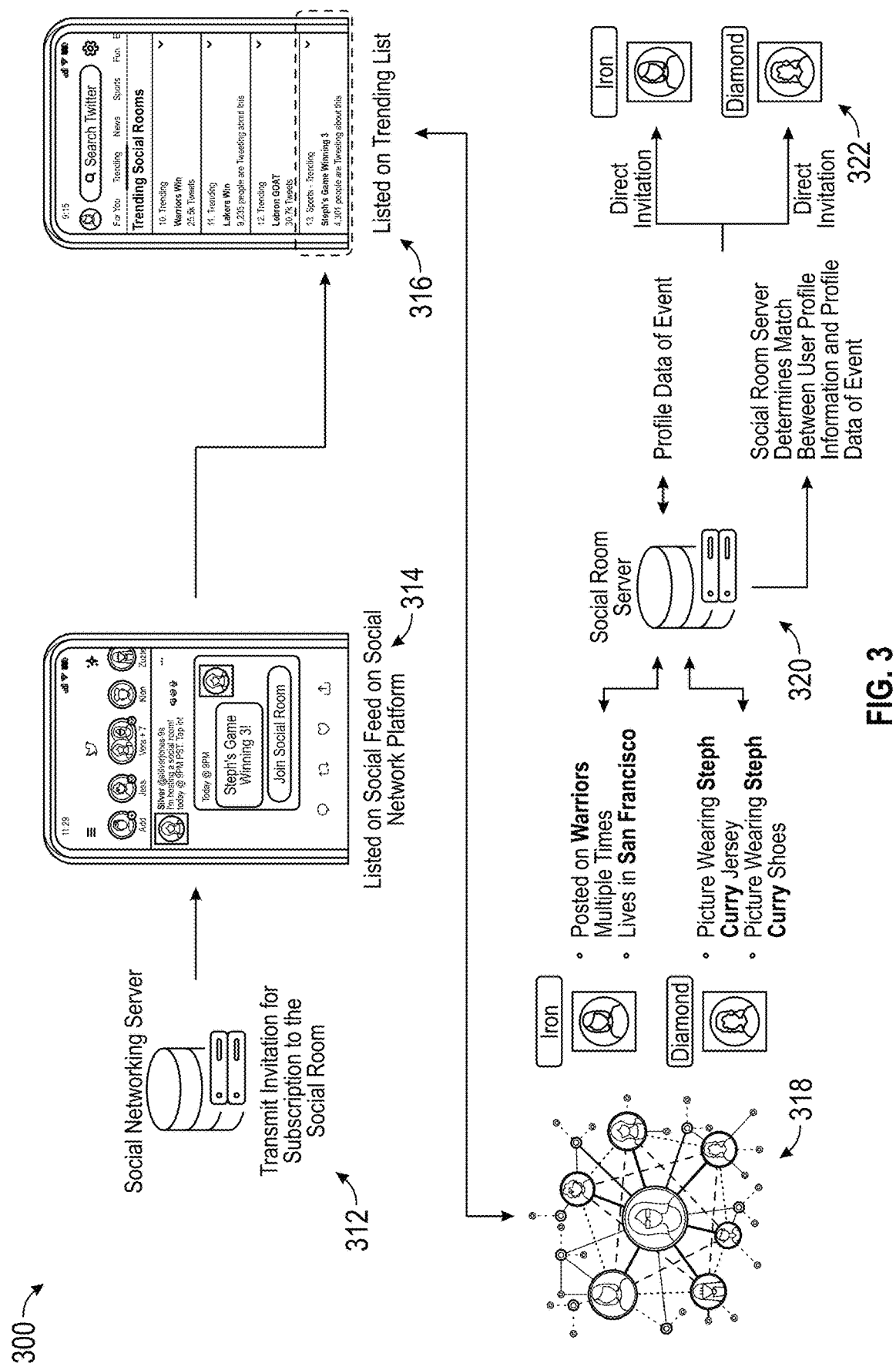
FIG. 3 shows an illustrative scenario of matching user profile data to profile data of a predicted future event, in accordance with some embodiments of this disclosure.

FIG. 3 shows an illustrative scenario 300 of matching user profile data to profile data of a predicted future event, in accordance with some embodiments of this disclosure. At 312, the social networking server transmits an invitation for subscription to the social room by posting on the social feed on the social networking platform 314. Furthermore, the invitation is listed on the trending social rooms on the social networking platform 316. The users on the social networking platform 318 include "Iron" who has posted on Warriors multiple times and lives in San Francisco. The user "Diamond" has posted a picture of himself wearing a Steph Curry jersey and a picture of himself wearing Steph Curry shoes. In some embodiments, the social networking server may determine profile data of the predicted future event. In this example, the profile data of the predicted future event (e.g., Steph Curry hitting a game-winning three-pointer) may include the following profile data: Warriors, Steph Curry, NBA, San Francisco. The social networking server may retrieve user profile data of the plurality of user devices. In this example, it will retrieve the data outlined above from Iron and Diamond. The social networking server may determine whether the user profile data matches the determined profile data of the predicted future event. In this scenario, there is a match of San Francisco and Warriors for Iron, and Steph Curry for Diamond 320. In response to the user profile data matching the determined profile data of the predicted future event, the social networking server transmits the invitation for subscription to the social room to the plurality of user devices on the social network platform. In this scenario, at 322, the social networking server transmits the invitation to Iron and Diamond. In some embodiments, the invitation may be a direct invitation such as a direct message, alert notification or similar communication to the subscribers.

Figure 4:
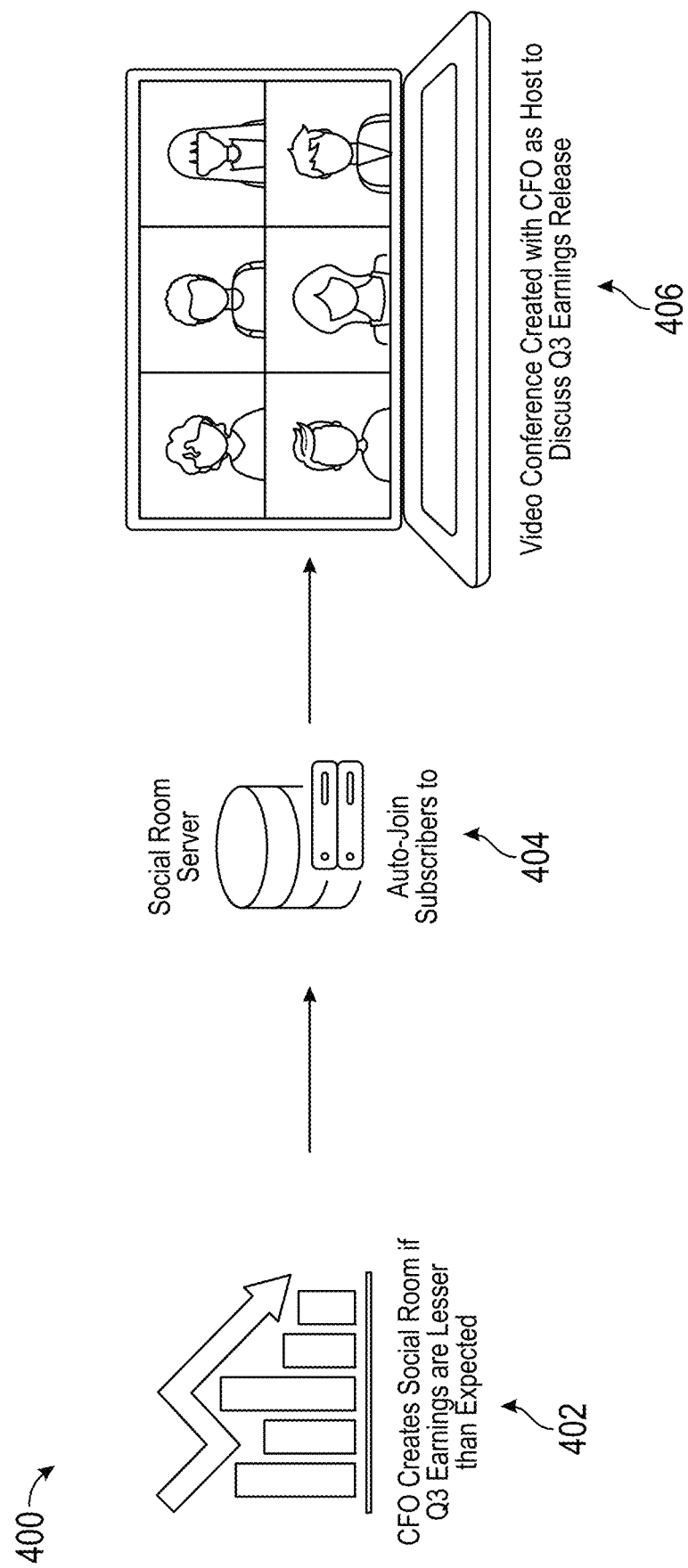
FIG. 4 shows an illustrative scenario of initiating a social room within a business environment for a predicted future event, in accordance with some embodiments of this disclosure.

FIG. 4 shows an illustrative scenario 400 of initiating a social room within a business environment for a predicted future event, in accordance with some embodiments of this disclosure. In this scenario, the social networking server may characterize the predicted future event as Q3 earnings being lower than expected 402. In this example, the CFO creates a social room based on Q3 earnings being lower than expected 404. Subscribers are automatically joined if this event occurs to discuss business strategy regarding the Q3 earnings 406. In some embodiments, the subscribers may be automatically subscribed to social rooms created by their team leader.

Figure 5:
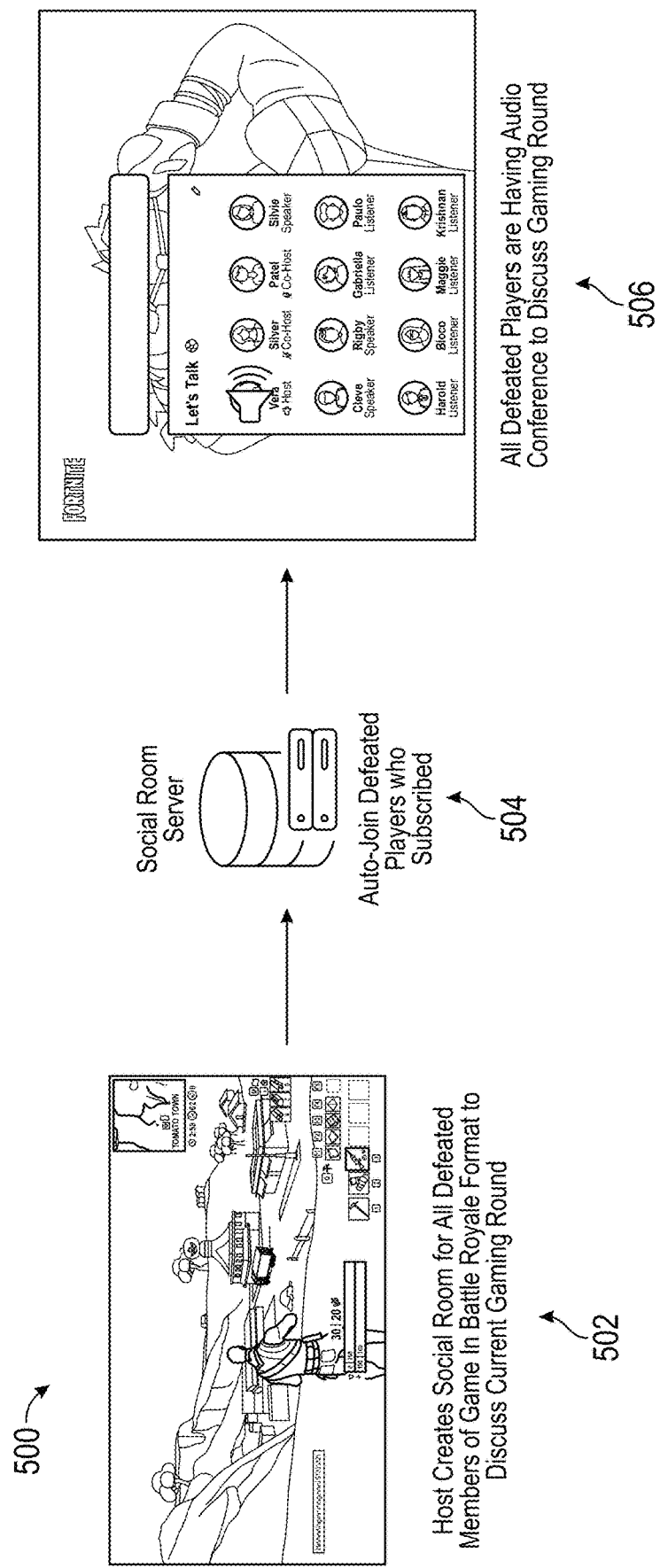
FIG. 5 shows an illustrative scenario of initiating a social room within a gaming environment for a predicted future event, in accordance with some embodiments of this disclosure.

FIG. 5 shows an illustrative scenario 500 of initiating a social room within a gaming environment for a predicted future event, in accordance with some embodiments of this disclosure. In this scenario, the social networking server may characterize the predicted future event as members of a game in a Battle Royale format being defeated and may create a social room for the defeated members to discuss the current gaming round 502. In this example, the defeated players may be given a prompt to accept or decline joining the social room of the defeated players 504. Subscribers who have subscribed to the social room are automatically joined if this event occurs to discuss their performance or other matters related (or unrelated) to the game 506. In some embodiments, the social room of the defeated players may include a video chat or VR chat. In some embodiments, the social room of the defeated players may include a separate game (which may have a series of levels) that is played until the new round starts for the Battle Royale.

In some embodiments, the social networking server may implement a relational database system (like a PostgreSQL) to keep track of hosts, users, rooms and conditions. This data may be included in the database. When the social networking server receives subscribers, the subscribers may retrieve information about the social room from this database. The database may include a publish/subscribe (pub-sub) architecture to archive predicted future events. In some embodiments, Kafka, a distributed pub-sub distributed messaging platform, or Amazon Web Service (AWS) Simple Notification System (SNS) may be implemented to store and serve data (e.g., replay of the predicted future event, rules of the social room, etc.) in relation to the predicted future events upon the condition being true.

In some embodiments, the social networking server may create a Web Real-Time Communication (WebRTC) (or WebSockets) session and auto-invite both the host user and a subset of subscribers to the initiated social room. In some embodiments, the social networking server may have the subset of subscribers auto-join a session created upon the predicted future event occurring (similar to Discord or Zoom platforms). In some embodiments, the subset of subscribers have a configuration setting not to accept the auto-join. In some embodiments, the social networking server may create a temporary server channel for the social room and send the links to the host user and the subset of subscribers to accelerate the social room staging. This method may exclusively be used where the social room odds are based on an event sensitive to low latency streaming. Once the event is triggered, social room members' attendance to the social room is simply converted from dormant to active. This method is preferable if no other content is used to stage the social room initiation. This is analogous to the room host and subscribers being in a waiting room till event odds are met and subsequently being auto joined by the social networking server.

In some embodiments, a host user on the social networking server may promote on the social networking platform rebroadcasts of previous social rooms. Invitations may be sent to a plurality of subscribers for previous social rooms. Upon acceptance of the invitations by the subscribers, the host user on the social networking server may provide access to the previous social rooms to the subscribers. In some embodiments, the host user may require a number of resource credits in order to access the rebroadcasts of previous social rooms from the subscribers.

In some embodiments, a host user may receive user interface prompts from the social networking server upon a plurality of updated evaluated probabilities being calculated.

Figure 6:
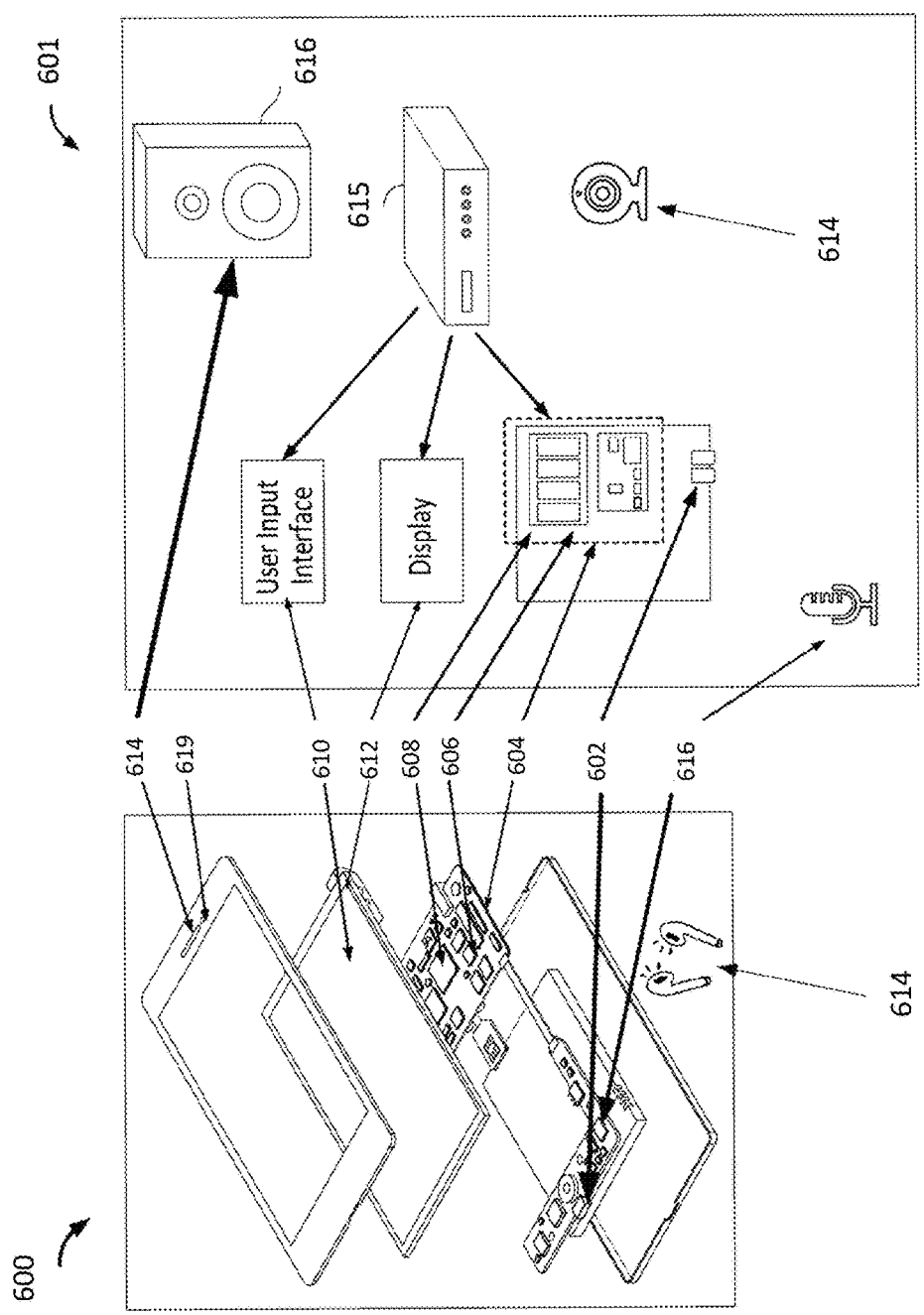
FIG. 6 shows illustrative user equipment devices, in accordance with some embodiments of this disclosure.
Figure 7:
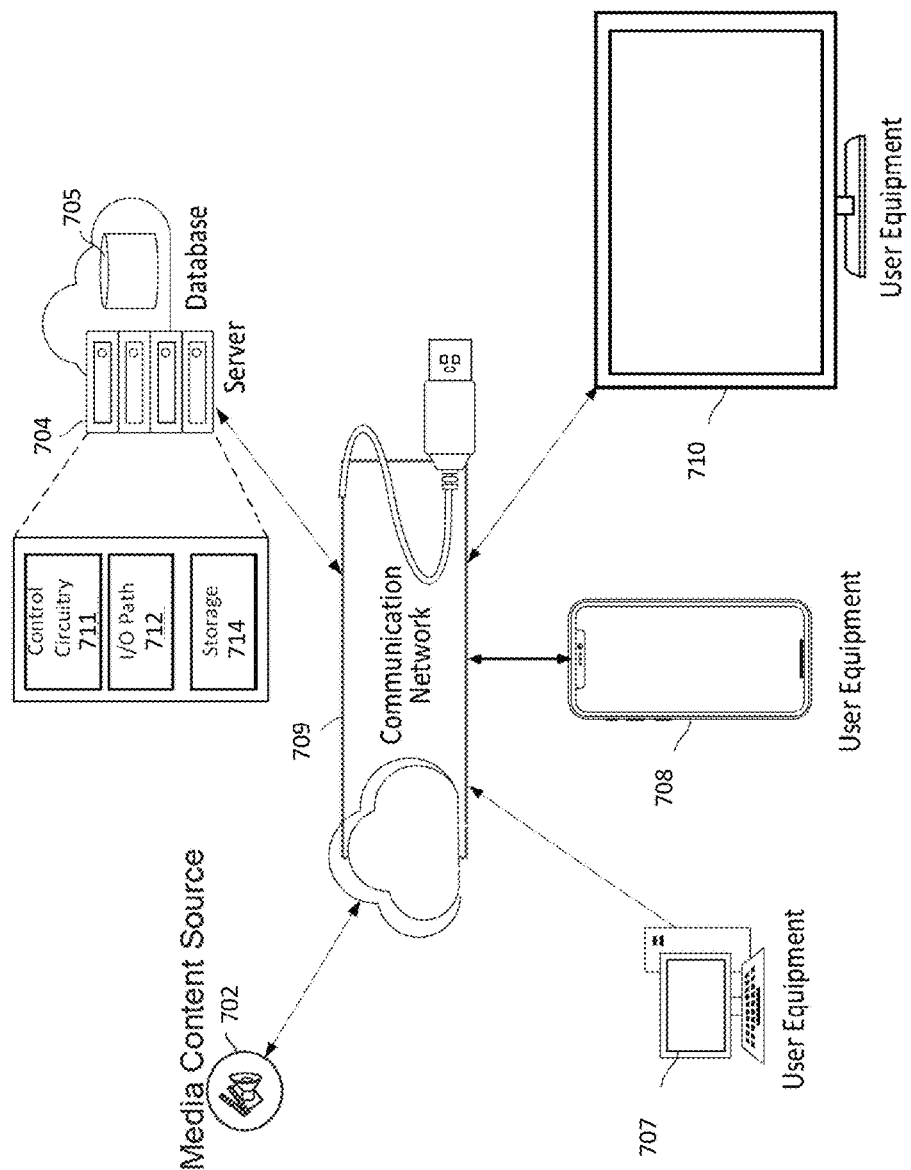
FIG. 7 shows illustrative systems, in accordance with some embodiments of this disclosure.

FIGS. 6-7 describe illustrative devices, systems, servers, and related hardware for a media application for efficient navigation of a plurality of media assets and for playing post-credit content in media assets by overriding play-next logic, in accordance with some embodiments of this disclosure. FIG. 6 shows generalized embodiments of illustrative user devices 600 and 601. For example, user equipment device 600 may be a smartphone device, a tablet, smart glasses, a virtual reality or augmented reality device (e.g., AR goggles, AR headset, AR implemented via smartphone, tablet, or computer), or any other suitable device capable of consuming media assets and capable of transmitting and receiving data over a communication network. In another example, user equipment device 601 may be a user television equipment system or device. User television equipment device 601 may include set-top box 615. Set-top box 615 may be communicatively connected to microphone 616, audio output equipment (e.g., speaker or headphones 614), and display 612. In some embodiments, microphone 616 may receive audio corresponding to a voice of a user, e.g., a voice command. In some embodiments, display 612 may be a television display or a computer display. In some embodiments, set-top box 615 may be communicatively connected to user input interface 610. In some embodiments, user input interface 610 may be a remote control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 600 may comprise any suitable number of sensors, as well as a GPS module (e.g., in communication with one or more servers and/or cell towers and/or satellites) to ascertain a location of device 600.

Each one of user equipment device 600 and user equipment device 601 may receive content and data via input/output (I/O) path 602. I/O path 602 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 6 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for the Media application stored in memory (e.g., storage 608). Specifically, control circuitry 604 may be instructed by the Media application to perform the functions discussed above and below. In some implementations, processing or actions performed by control circuitry 604 may be based on instructions received from the Media application.

In client/server-based embodiments, control circuitry 604 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the media application may be a client/server application where only the client application resides on device 600, and a server application resides on an external server (e.g., server 704 and/or server 716). For example, the media application may be implemented partially as a client application on control circuitry 604 of device 600 and partially on server 704 as a server application running on control circuitry 711. Server 704 may be a part of a local area network with one or more of devices 600 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 704), referred to as "the cloud." Device 600 may be a cloud client that relies on the cloud computing capabilities from server 704 to determine whether processing should be offloaded and facilitate such offloading. When executed by control circuitry 604 or 711, the media application may instruct control circuitry 604 or 711 circuitry to perform processing tasks for the client device and facilitate a media consumption session integrated with social network services. The client application may instruct control circuitry 604 to determine whether processing should be offloaded.

Control circuitry 604 may include communications circuitry suitable for communicating with a server, social network service, a table or database server, or other networks or servers The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media application data described above. Nonvolatile memory may also be used (e.g., to launch a boot-up routine and other instructions). Cloud-based storage may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and equipment 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The media application may be implemented using any suitable architecture. For example, it may be a stand-alone application wholly-implemented on each one of user equipment device 600 and user equipment device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide media consumption and social network interaction functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a media application and social network profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the media application is a client/server-based application. Data for use by a thick or thin client implemented on each one of user equipment device 600 and user equipment device 601 may be retrieved on-demand by issuing requests to a server remote to each one of user equipment device 600 and user equipment device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display may then be transmitted to device 600 for presentation to the user.

In some embodiments, the media application may be downloaded and interpreted or otherwise run by an interpreter or virtual machine (run by control circuitry 604). In some embodiments, the media application may be encoded in the ETV Binary Interchange Format (EBIF), received by control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2 or other digital media encoding schemes), the media application may be, for example, encoded and transmitted in an MPEG-2 object carousel with the MPEG audio and video packets of a program.

FIG. 7 is a diagram of an illustrative system 700, in accordance with some embodiments of this disclosure. User equipment devices 707, 708, 710 (e.g., user device; devices or any other suitable devices, or any combination thereof) may be coupled to communication network 706. Communication network 706 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 may comprise media content source 702, one or more servers 704, and one or more social network services. In some embodiments, the media application may be executed at one or more of control circuitry 711 of server 704 (and/or control circuitry of user equipment devices 707, 708, 710.

In some embodiments, server 704 may include control circuitry 711 and storage 714 (e.g., RAM, ROM, Hard Disk, Removable Disk, etc.). Instructions for the media application may be stored in storage 714. In some embodiments, the media application, via control circuitry, may execute functions outlined in FIGS. 1-11. Storage 714 may store one or more databases. Server 704 may also include an input/output path 712. I/O path 712 may provide media consumption data, social networking data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths. I/O path 712 may comprise I/O circuitry.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711.

Figure 8:
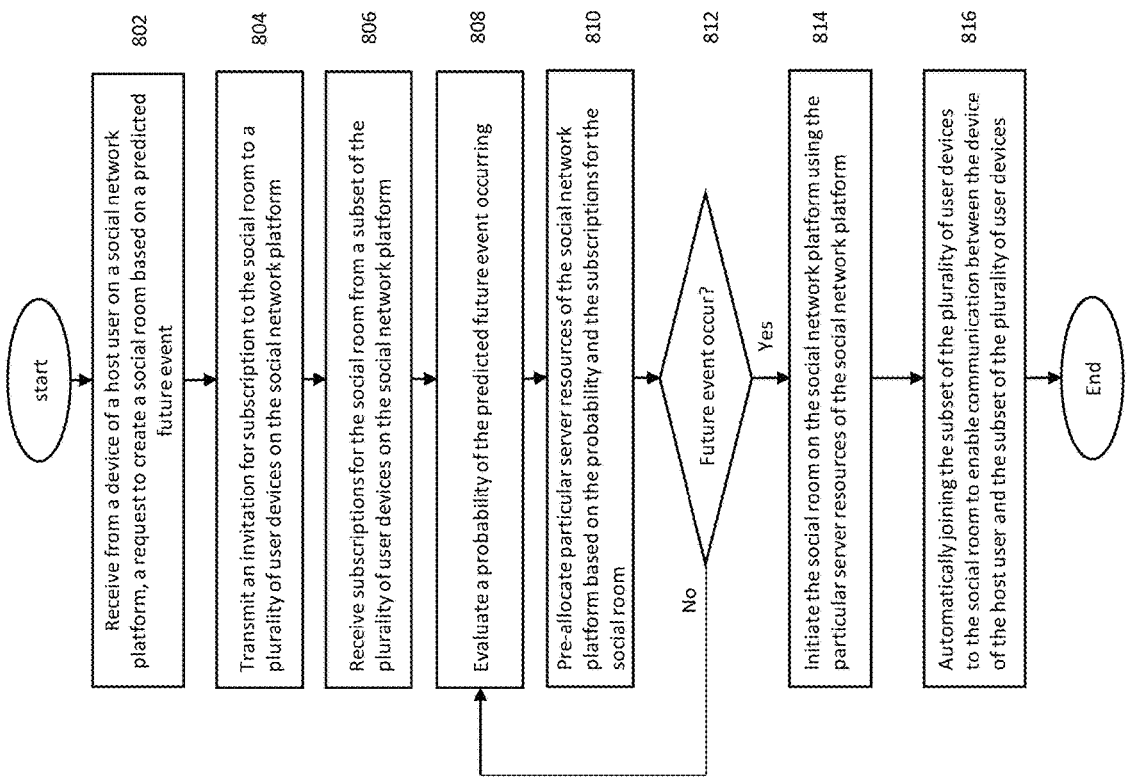
FIG. 8 is a flowchart of a detailed illustrative process for initiating a social room on a social network platform upon a predicted future event occurring, in accordance with some embodiments of this disclosure.

FIG. 8 is a flowchart of a detailed illustrative process 800 for initiating a social room on a social network platform upon a predicted future event occurring, in accordance with some embodiments of this disclosure. In various embodiments, the individual steps of process 800 may be implemented by one or more components of the devices and systems of FIGS. 1-7. Although the present disclosure may describe certain steps of process 800 (and of other processes described herein) as being implemented by certain components of the devices and systems of FIGS. 1-7, this is for purposes of illustration only, and it should be understood that other components of the devices and systems of FIGS. 1-7 may implement those steps instead.

At 802, the social networking server, via the control circuitry 711, receives, from a device of a host user on a social network platform, a request to create a social room based on a predicted future event. In some embodiments, the device of the host user may be a user equipment 600, 707, 708, or 710. In some embodiments, the social networking server receives the request via the communication network 709 and/or I/O path 712. At 804, the social networking server, via the control circuitry 711, transmits an invitation for subscription to the social room to a plurality of user devices on the social network platform. In some embodiments, the social networking server transmits the request via the communication network 709 and/or I/O path 712. In some embodiments, the plurality of user devices may be user equipment 600, 707, 708, and/or 710.

At 806, the social networking server, via the control circuitry 711, receives subscriptions for the social room from a subset of the plurality of user devices on the social network platform. In some embodiments, the social networking server receives the subscriptions via the communication network 709 and/or I/O path 712. At 808, the social networking server, via the control circuitry 711, evaluates a probability of the predicted future event occurring. In some embodiments, the control circuitry 711 may implement a machine learning model to evaluate the probability. At 810, the social networking server, via the control circuitry 711, pre-allocates particular server resources of the social network platform based on the probability and the subscriptions for the social room.

If, at 812, the social networking server, via control circuitry 711, determines that the predicted future event has not occurred, then the processing reverts to 808. If, at 812, the social networking server, via control circuitry 711, determines that the predicted future event has occurred, then the processing proceeds to 814. At 814, the social networking server, via the control circuitry 711, initiates the social room on the social network platform using the particular server resources of the social network platform. In some embodiments, the utilization of the particular server resources is accessed through the communication network 709 and/or I/O path 712. In some embodiments, the particular server resources may be in the storage 714 or database 705.

At 816, the social networking server, via the control circuitry 711, automatically joins the subset of the plurality of user devices to the social room to enable communication between the device of the host user and the subset of the plurality of user devices. In some embodiments, the automatically joining the subset of the plurality of user devices utilizes the communication network 709 and/or I/O path 712.

Figure 9:
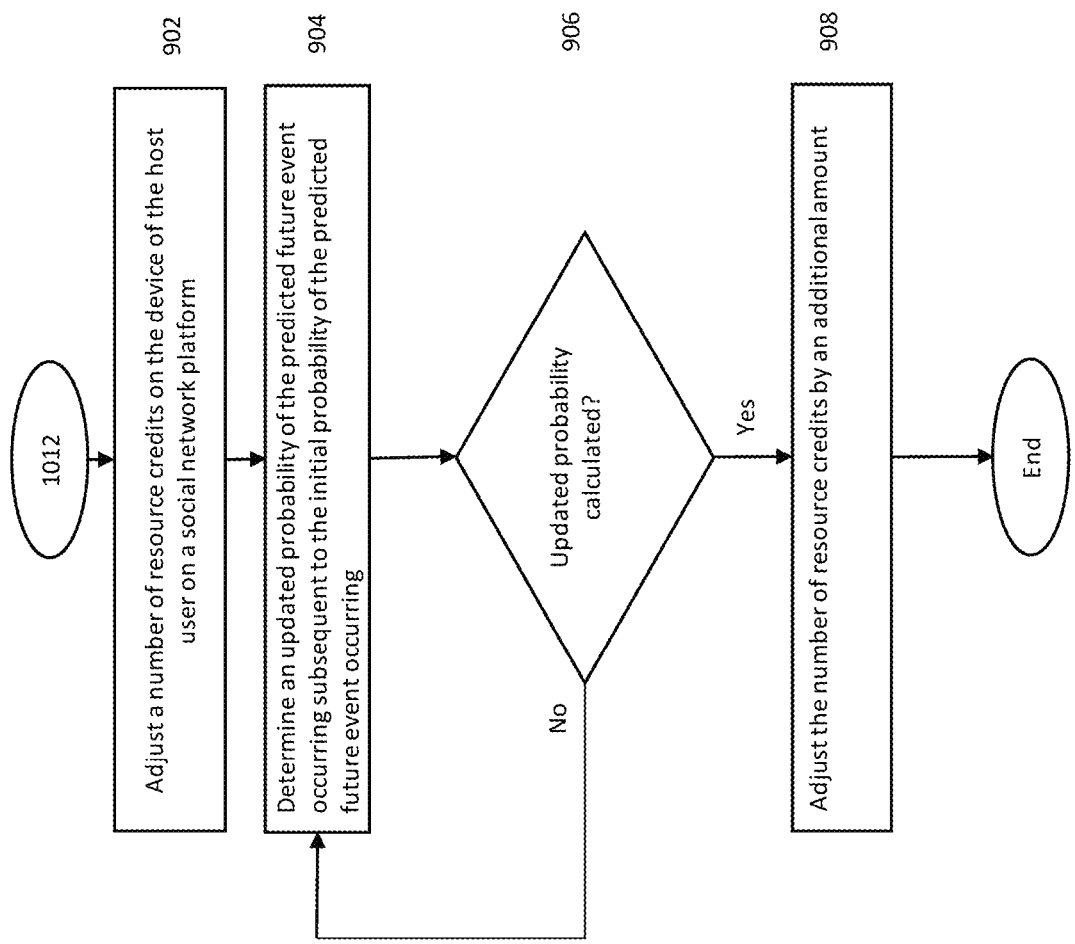
FIG. 9 is a flowchart of a detailed illustrative process for adjusting the number of resource credits for a user profile of a host user, in accordance with some embodiments of this disclosure.

FIG. 9 is a flowchart of a detailed illustrative process 900 for adjusting the number of resource credits for a user profile of a host user, in accordance with some embodiments of this disclosure. At 902, the social networking server, via the control circuitry 711, adjusts a number of resource credits on the device of the host user on a social network platform. In some embodiments, the adjustment of the number of resource credits on the device of the host user are accessed through the communication network 709 and/or I/O path 712. In some embodiments, the record of the adjustment of the number of resource credits on the device of the host user may be stored via storage 714 or database 705.

At 904, the social networking server, via the control circuitry 711, determines an updated probability of the predicted future event occurring subsequent to the initial probability of the predicted future event occurring. In some embodiments, the control circuitry 711 may implement a machine learning model. If, at 906, the social networking server, via control circuitry 711, determines that the probability was incorrectly calculated, then the processing reverts to 904. If, at 906, the social networking server, via control circuitry 711, determines that the probability was correctly calculated, then the processing proceeds to 908.

At 908, the social networking server, via the control circuitry 711, adjusts the number of resource credits by an additional amount. In some embodiments, the additional amount by which the number of resource credits on the device of the host user should be adjusted is are accessed through the communication network 709 and/or I/O path 712. In some embodiments, the record of the adjustment of the number of resource credits by an additional amount on the device of the host user may be stored via storage 714 or database 705.

Figure 10:
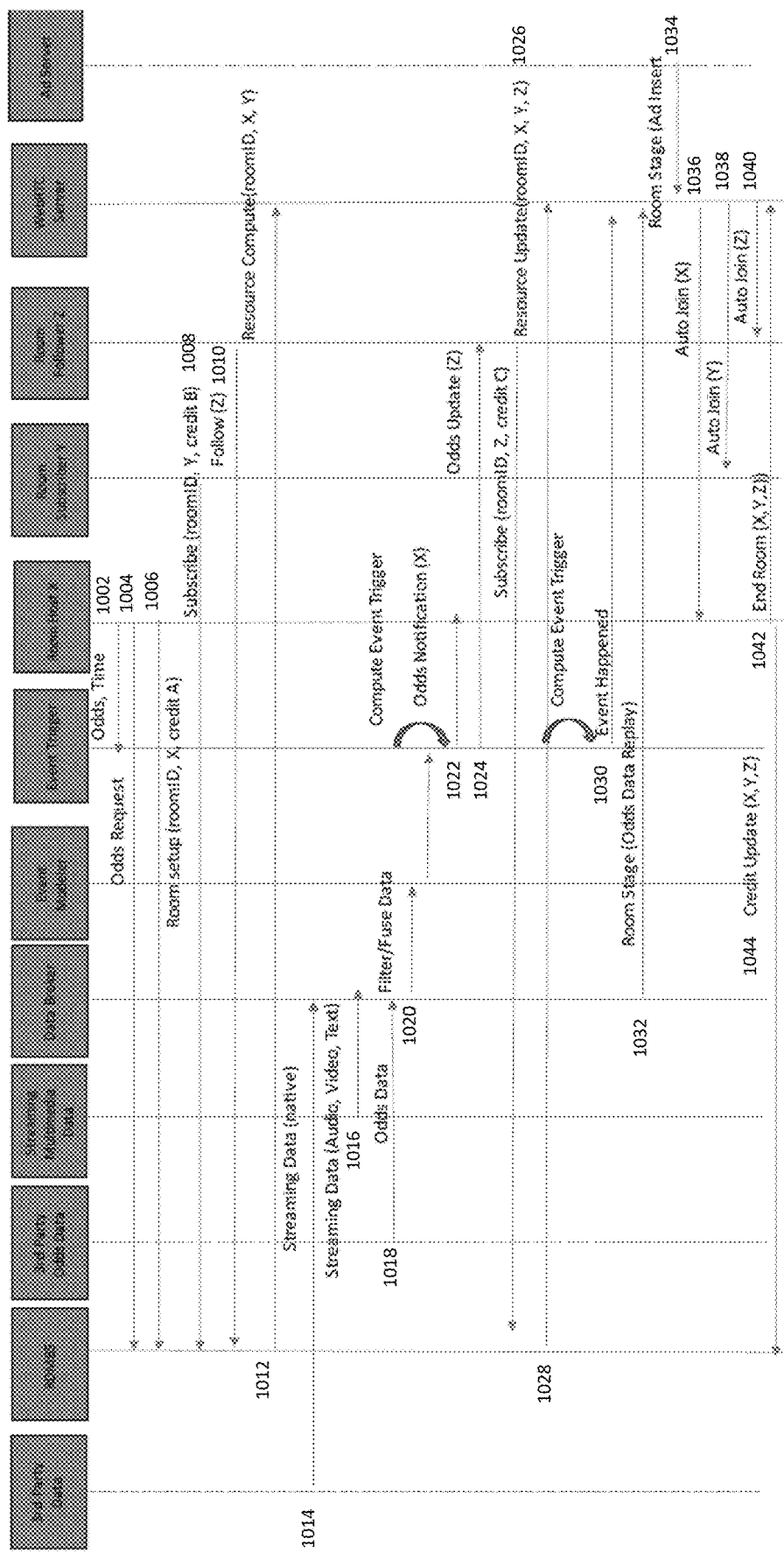
FIG. 10 is a flow diagram of a detailed illustrative process for initiating a social room on a social network platform, in accordance with some embodiments of this disclosure.

FIG. 10 is a flow diagram of a detailed illustrative process 1000 for initiating a social room on a social network platform, in accordance with some embodiments of this disclosure. At 1002, the social networking server, via the control circuitry 711, determines that the device of the host user receives an event trigger based on a time and odds. At 1004, the social networking server, via the control circuitry 711, determines the odds request from the relational database management system (RDBMS). At 1006, the social networking server, via the control circuitry 711, sets up the social room with room identification and specific number of resource credits as per the RDBMS. At 1008, the social networking server, via the control circuitry 711, receives subscribers to the social room from subscriber Y who transfers a number of resource credits to the host user to join the social room.

At 1010, the social networking server, via the control circuitry 711, receives subscribers to the social room from subscriber Z. At 1012, the social networking server, via the control circuitry 711, streams data to a WebRTC server, which is a particular server resource. At 1014, the social networking server, via the control circuitry 711, streams third-party data to a data broker and at 1016 streams specific video, audio, and text. At 1018, the social networking server, via the control circuitry 711, sends odds data to the data broker.

At 1020, the social networking server, via the control circuitry 711, filters and fuses the data. At 1022, the social networking server, via the control circuitry 711, computes whether the predicted future event occurs, and if so, an odds notification is sent to the subscriber (1024). At 1026, the social networking server, via the control circuitry 711, updates the resource credits of the subscribers. At 1028 and 1030, the social networking server, via the control circuitry 711, computes the event trigger to verify it happened.

At 1032, the social networking server, via the control circuitry 711, performs a data replay of the event for the subscribers. At 1034, the social networking server, via the control circuitry 711, receives an advertisement from an advertisement server and joins the respective social rooms to forward the advertisement (1036, 1038, and 1040). At 1042, the social networking server, via the control circuitry 711, ends the social room and updates the resource credits for the subscribers (1044).

Figure 11:
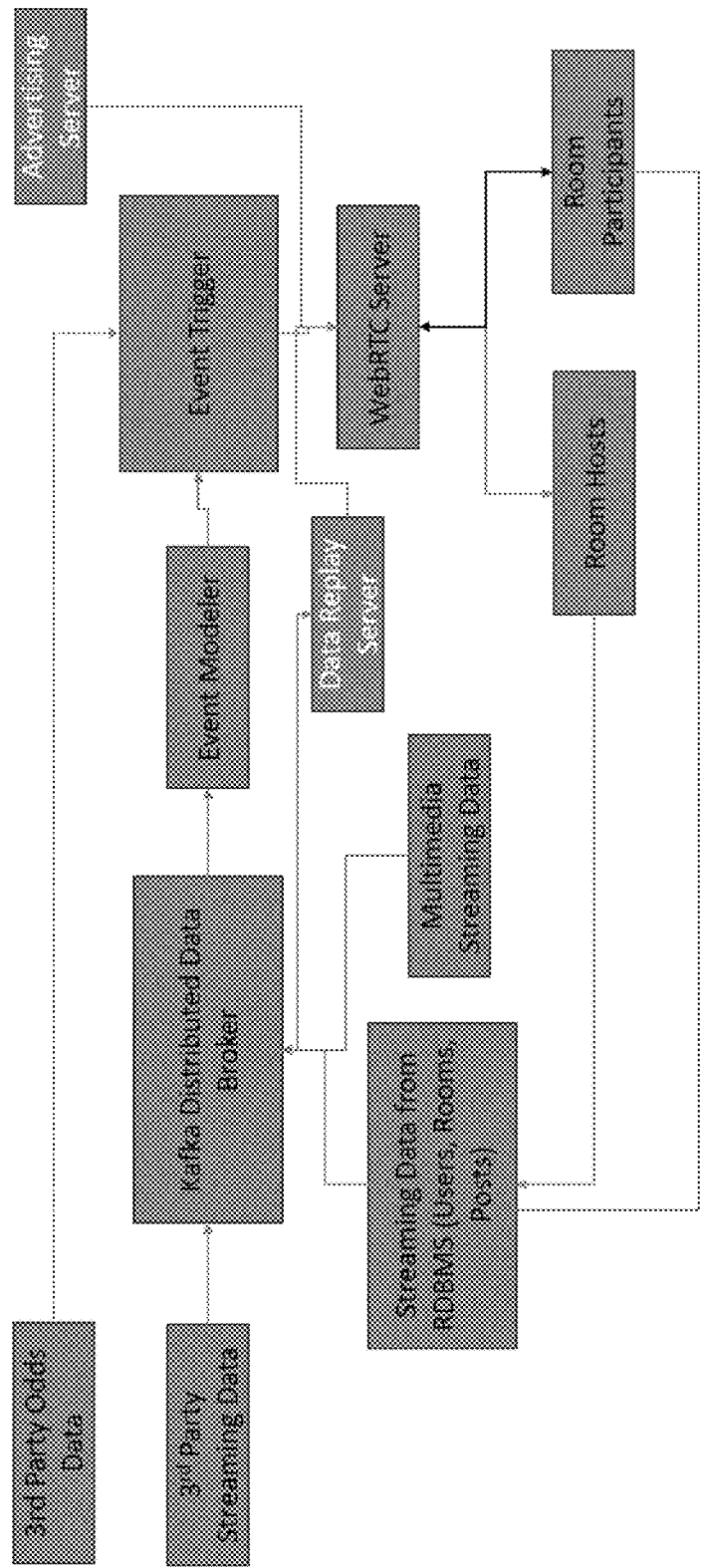
FIG. 11 is a block diagram of a system for initiating a social room on a social network platform, in accordance with some embodiments of this disclosure.

FIG. 11 is a block diagram 1100 of a system for initiating a social room on a social network platform, in accordance with some embodiments of this disclosure. In this exemplar of the system, the system includes a WebRTC server, a data replay server, an RDBMS, an event modeler, an event trigger, room hosts, room participants, and an advertiser server.

The data is handled via a Kafka distributed data broker, third-party streaming data, third-party odds data, and multimedia streaming data.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, from a device of a host user on a social network platform, a request to create a social room based on a predicted future event;
   transmitting an invitation for subscription to the social room to a plurality of user devices on the social network platform;
   receiving subscriptions for the social room from a subset of the plurality of user devices on the social network platform;
   evaluating a probability of the predicted future event occurring;
   pre-allocating particular server resources of the social network platform based on the probability and the subscriptions for the social room, wherein the particular server resources comprise at least one of: processing cores, memory storage, or network bandwidth, and wherein the pre-allocating is based at least in part on:
      determining a location of the device of the host user;
      determining locations of a plurality of networking resources;
      determining at least one networking resource that is the most proximate to the device of the host user; and
      allocating the at least one networking resource to the device of the host user; and
   in response to determining that the predicted future event occurred:
      initiating the social room on the social network platform using the particular server resources of the social network platform; and
      automatically joining the subset of the plurality of user devices to the social room to enable communication between the device of the host user and the subset of the plurality of user devices.

2. The method of claim 1, further comprising:
   in response to the determining that the predicted future event occurred:
      adjusting a number of resource credits of a profile of the host user, wherein the adjusting is inversely correlated with the probability of the predicted future event occurring.

3. The method of claim 2, wherein the probability of the predicted future event occurring is an initial probability; and the method further comprises:
   determining an updated probability of the predicted future event occurring subsequent to the initial probability of the predicted future event occurring; and
   in response to determining that the updated probability is greater than the initial probability, adjusting the number of resource credits of the profile of the host user by an additional amount.

4. The method of claim 1, further comprising,
   wherein the social room is a first social room;
   receiving, from the device of the host user, another request to create a second social room based on a second predicted future event; and
   in response to determining that the second predicted future event does not occur, subtracting a number of resource credits from a profile of the host user on the social network platform.

5. The method of claim 1, wherein subsequent to the automatically joining the subset of the plurality of user devices to the social room to enable the communication between the device of the host user and the subset of the plurality of user devices, the method further comprises:
   determining whether a profile of the device of the host user performs an action within the social room within a time threshold; and
   in response to the determining that the profile of the device of the host user does not perform the action within the social room within the time threshold, subtracting a number of resource credits from the profile of the host user on the social network platform.

6. The method of claim 1, wherein receiving the subscriptions for the social room from the subset of the plurality of user devices on the social network platform further comprises subtracting a number of resource credits from each respective profile associated with each respective user device of the subset of the plurality of user devices subscribing to the social room.

7. The method of claim 1, wherein the evaluating the probability of the predicted future event occurring comprises:
receiving training data, wherein the training data is historical data related to past events similar to the predicted future event;
training a machine learning model based on the received training data; and
determining the probability of the predicted future event occurring based on inputting current data relating to the predicted future event into the machine learning model.

8. The method of claim 1, wherein the transmitting the invitation for subscription to the social room to the plurality of user devices on the social network platform further comprises:
determining profile data of the predicted future event;
retrieving user profile data of the plurality of user devices;
determining whether the user profile data matches the determined profile data of the predicted future event; and
in response to the user profile data matching the determined profile data of the predicted future event, transmitting the invitation for subscription to the social room to the plurality of user devices on the social network platform.

9. A system comprising:
control circuitry configured to:
receive, from a device of a host user on a social network platform, a request to create a social room based on a predicted future event;
transmit an invitation for subscription to the social room to a plurality of user devices on the social network platform;
receive subscriptions for the social room from a subset of the plurality of user devices on the social network platform;
evaluate a probability of the predicted future event occurring;
pre-allocate particular server resources of the social network platform based on the probability and the subscriptions for the social room, wherein the particular server resources comprise at least one of: processing cores, memory storage, or network bandwidth, and wherein pre-allocating is based at least in part on:
determining a location of the device of the host user;
determining locations of a plurality of networking resources;
determining at least one networking resource that is the most proximate to the device of the host user; and
allocating the at least one networking resource to the device of the host user; and
in response to determining that the predicted future event occurred:
initiate the social room on the social network platform using the particular server resources of the social network platform; and
automatically join the subset of the plurality of user devices to the social room to enable communication between the device of the host user and the subset of the plurality of user devices.

10. The system of claim 9, wherein the system is further configured to:
in response to the determining that the predicted future event occurred:
adjust a number of resource credits of a profile of the host user, wherein the adjustment is inversely correlated with the probability of the predicted future event occurring.

11. The system of claim 10, wherein the probability of the predicted future event occurring is an initial probability; and the system is further configured to:
determine an updated probability of the predicted future event occurring subsequent to the initial probability of the predicted future event occurring; and
in response to determining that the updated probability is greater than the initial probability, adjust the number of resource credits of the profile of the host user by an additional amount.

12. The system of claim 9, wherein the social room is a first social room;
and wherein the system is further configured to:
receive, from the device of the host user, another request to create a second social room based on a second predicted future event; and
in response to determining that the second predicted future event does not occur, subtract a number of resource credits from a profile of the host user on the social network platform.

13. The system of claim 9, wherein subsequent to the automatically joining the subset of the plurality of user devices to the social room to enable the communication between the device of the host user and the subset of the plurality of user devices, the system is further configured to:
determine whether a profile of the device of the host user performs an action within the social room within a time threshold; and
in response to the determining that the profile of the device of the host user does not perform the action within the social room within the time threshold, subtract a number of resource credits from the profile of the host user on the social network platform.

14. The system of claim 9, wherein the system is further configured, when receiving the subscriptions for the social room from the subset of the plurality of user devices on the social network platform, to subtract a number of resource credits from each respective profile associated with each respective user device of the subset of the plurality of user devices subscribing to the social room.

15. The system of claim 9, wherein the system is configured, when evaluating the probability of the predicted future event occurring, to:
receive training data, wherein the training data is historical data related to past events similar to the predicted future event;
train a machine learning model based on the received training data; and
determine the probability of the predicted future event occurring based on inputting current data relating to the predicted future event into the machine learning model.

16. The system of claim 9, wherein the system is further configured, when transmitting the invitation for subscription to the social room to the plurality of user devices on the social network platform, to:
determine profile data of the predicted future event;
retrieve user profile data of the plurality of user devices;

determine whether the user profile data matches the determined profile data of the predicted future event; and in response to the user profile data matching the determined profile data of the predicted future event, transmit the invitation for subscription to the social room to the plurality of user devices on the social network platform.

* * * * *